J. GRAVES & C. C. REED.
TOPPING MACHINE.
APPLICATION FILED APR. 27, 1910.
1,015,951.
Patented Jan. 30, 1912.
3 SHEETS—SHEET 1.
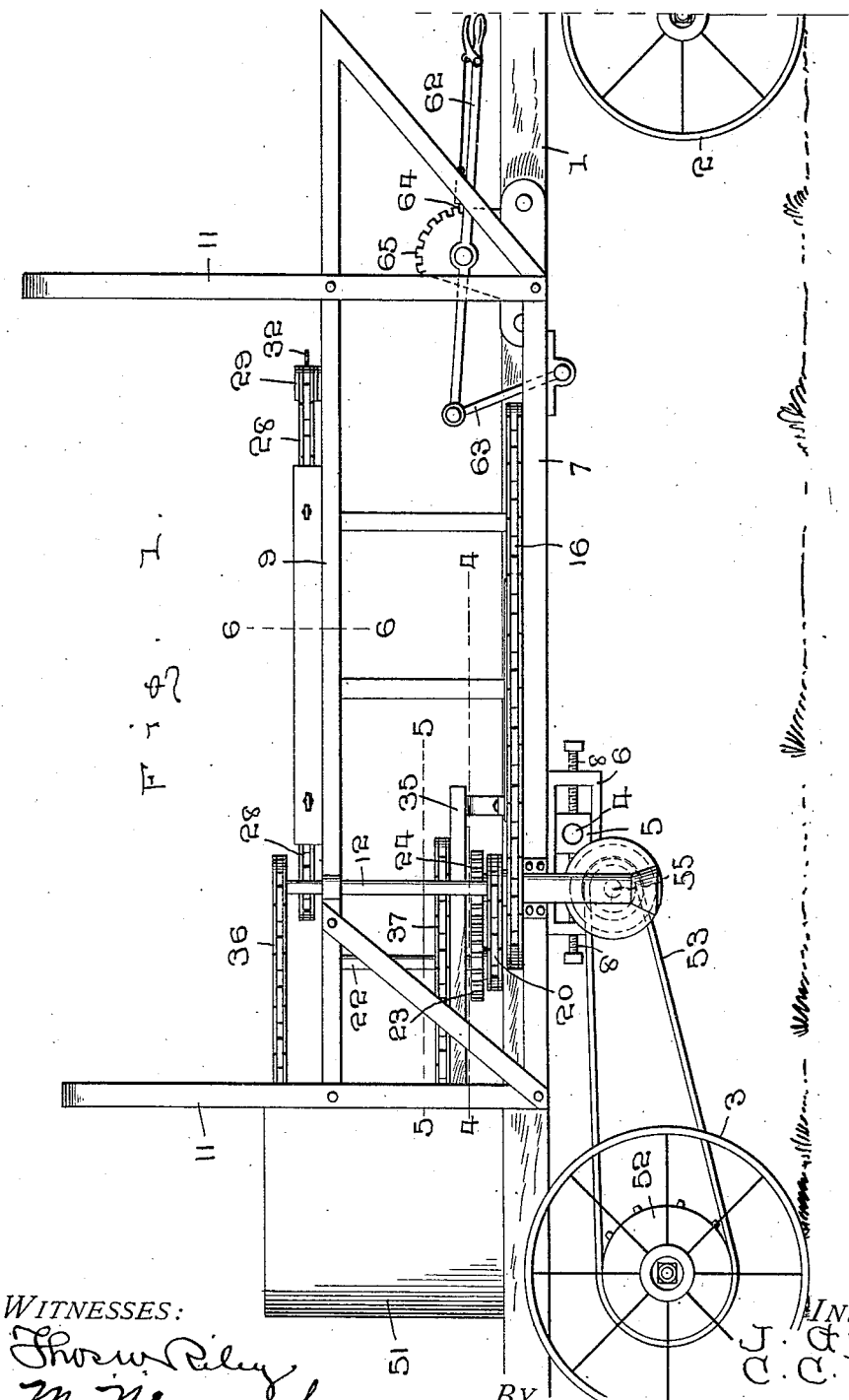
WITNESSES:
Thos W Riley
M. Newcomb
INVENTOR
J. Graves
C. C. Reed
BY
W. J. FitzGerald & Co.
Attorneys

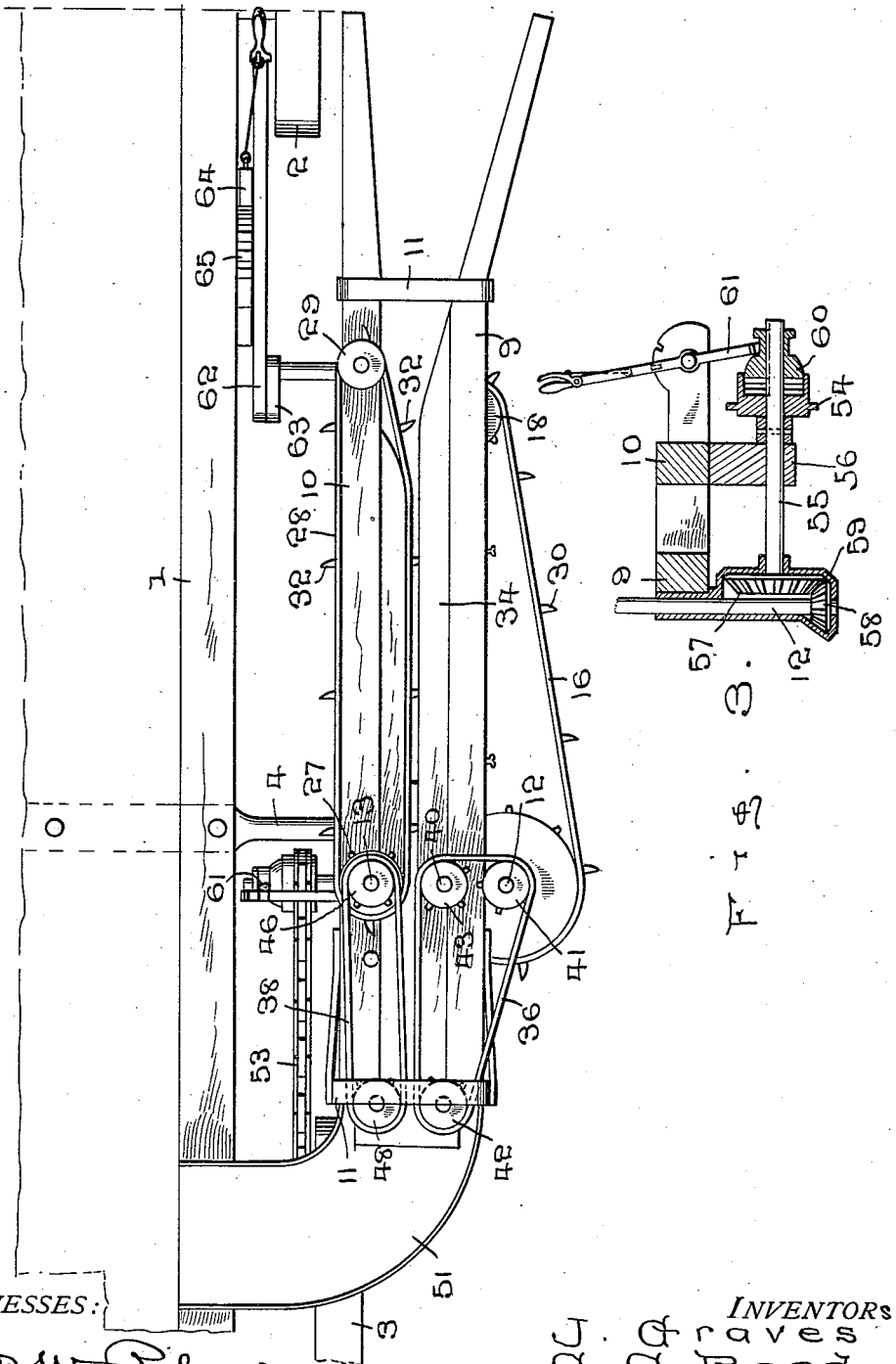

J. GRAVES & C. C. REED.
TOPPING MACHINE.
APPLICATION FILED APR. 27, 1910.
1,015,951.
Patented Jan. 30, 1912.
3 SHEETS—SHEET 3.
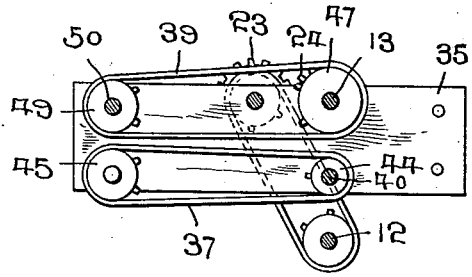
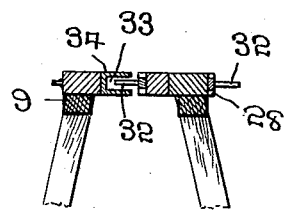
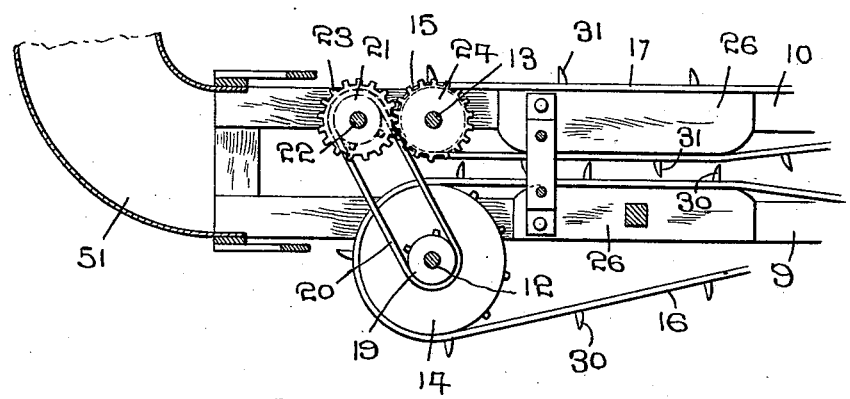
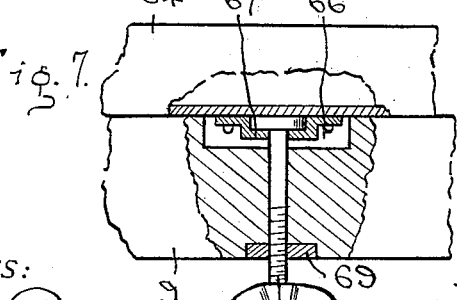
WITNESSES:
Thos. W. Riley
M. Newcomb
INVENTORS
J. Graves
C. C. Reed
BY
W. J. Fitzgerald & Co.
Attorneys
COLUMBIA PLANOGRAPH CO., WASHINGTON, D. C.

UNITED STATES PATENT OFFICE.

JOHN GRAVES AND CLARENCE C. REED, OF ARKANSAS CITY, KANSAS.

TOPPING-MACHINE.

1,015,951. Specification of Letters Patent. Patented Jan. 30, 1912.

Application filed April 27, 1910. Serial No. 558,037.

*To all whom it may concern:*

Be it known that we, JOHN GRAVES and CLARENCE C. REED, citizens of the United States, residing at Arkansas City, in the county of Cowley and State of Kansas, have invented certain new and useful Improvements in Topping-Machines; and we do hereby declare the following to be a full, clear, and exact description of the invention, such as will enable others skilled in the art to which it appertains to make and use the same.

Our invention relates to new and useful improvements in topping machines and more particularly to the class adapted to be used for gathering broom corn and our object is to provide means for adjustably mounting the topping device upon a vehicle.

A further object is to provide means for engaging the stalks of the broom corn and moving the same into engagement with an object with sufficient force to break the stalks and separate the upper portion therefrom.

A further object is to provide means for conveying the severed portion of the stalks on to the vehicle.

A further object is to provide a suitable driving mechanism for the device.

Other objects and advantages will be hereinafter referred to and more particularly pointed out in the specification and claims.

In the accompanying drawings which are made a part of this application, Figure 1 is a side elevation of a portion of a vehicle showing the topping device attached thereto. Fig. 2 is a top plan view thereof. Fig. 3 is a detail sectional view of a clutch mechanism and driving means for the device. Fig. 4 is a detail sectional view as seen on line 4—4 Fig. 1. Fig. 5 is a sectional view as seen on line 5—5 Fig. 1. Fig. 6 is a sectional view as seen on line 6—6 Fig. 1, and, Fig. 7 is a detail view of the adjusting means for the guide plate.

Referring to the drawings in which similar reference numerals designate corresponding parts throughout the several views, 1 indicates the rack or bed of the vehicle, which is provided with forward and rear trucks 2 and 3, said rack and trucks being constructed in the usual or any preferred manner.

Attached to the rack 1 and extending laterally therefrom is an axle 4, upon which is rotatably mounted a block 5, said block being adjustably mounted in a slotted casting 6 below the frame 7 of the topping device. The block 5 is held in adjusted relation with the casting 6 by introducing screws 8 through opposite ends of the casting, the inner ends of the screws engaging the faces of the block, in which manner the frame 7 may be adjusted longitudinally with respect to the rack upon which it is mounted.

The frame 7 consists of pairs of parallel bars 9 and 10, which bars are connected together by means of yokes 11 adjacent opposite ends of the bars and said pairs of bars are spaced apart to receive the upper portions of the stalks of the broom corn.

Extending vertically of the frame 7 are shafts 12 and 13, upon which shafts are mounted sprockets 14 and 15 respectively, the shafts 12 and 13 being rotatably mounted upon the bars 9 and 10 respectively, thereby disposing said shafts on opposite sides of the space between the bars. Extending around the sprockets 14 and 15 are chains 16 and 17 respectively, which chains extend longitudinally of the bars 9 and 10 and around idlers 18 adjacent the forward ends of the bars, said chains being driven by the rotation of the sprockets, around which they extend. The sprocket 15 and shaft 13 are driven from the shaft 12 by fixing to said shaft 12 a pinion 19, with which coöperates a chain 20, the opposite end of the chain extending around a pinion 21 carried by a shaft 22, which shaft has a gear 23 thereon meshing with a gear 24 on the shaft 13.

The forward ends of the bars 9 and 10 are preferably flared so that the stalks of the broom corn will readily pass therebetween and to permit the stalks to readily pass between the chains 16 and 17, the forward ends of the chains are also caused to extend at an angle by attaching guide boards 25 and 26 to the lowermost bars 9 and 10, the chains 16 and 17 traveling along the inner edges of said boards.

Attached to the shaft 13 above the upper bar 10 is a sprocket 27, around which takes a chain 28, the forward end of the chain extending around an idler 29 adjacent the forward portion of the upper bar 10, said chain being adapted to engage the upper ends of the stalks as they pass between the frame bars.

The chains 16 and 17 are provided with fingers 30 and 31 respectively, which fingers engage the stalks at a point a distance below their heads, while the chain 28 is likewise provided with fingers 32, which engage the stalks adjacent their heads, thus positively moving the upper portions of the stalks between the bars of the frame and at a speed equal to or slightly greater than the travel of the vehicle to which the topping device is attached. The fingers 32 on the chain 28 travel through a channel 33 of a guide plate 34, said guide plate being adjustably secured to the upper bar 9 by means of threaded shanks 68, which pass through the interiorly threaded plate 69 and upper bar 9 near either end thereof. The shanks 68 are provided at one end with a flat head which is rotatably mounted within the housings 67 carried by the guide plate. The upper bar 9 is cut away as shown at 66, this is to permit the guide plate and upper bar being brought closely together. In this way it will be seen that a guide for the fingers 32 is provided which may be adjusted to or from the bar 10.

The stalk after being engaged by the fingers on the chains is moved into engagement with a breaker board 35, which is positioned between the upper and lower bars of the frame and across the space between the bars and in view of the pull given the stalk when entered against the end of the breaker board, said stalk will be snapped in two, that portion of the stalk above the breaker board being then engaged by guide chains 36 and 37 and 38 and 39. The chain 36 is operated from the shaft 12, the chains 38 and 39 from the shaft 13 and the chain 37 from the auxiliary shaft 40. The chains 36 and 38 are positioned above the upper bars 9 and 10, while the chains 37 and 39 are positioned respectively below said upper chains and immediately above the breaker board 35. The chain 36 passes around a sprocket 41 at the upper end of the shaft 12 and around an idler 42 at the rear end of the bar 9, said chain being also extended around a sprocket 43 at the upper end of the auxiliary shaft 40, that portion of the chain between the idler and sprocket 43 being held substantially in alinement with the bar 9. The chain 37 passes around a sprocket 44 on the shaft 40 and an idler 45 mounted upon the breaker board 35. The chains 38 and 39 extend around sprockets 46 and 47 on the shaft 13, the opposite ends of the chains extending around idlers 48 and 49, which idlers are mounted upon a shaft 50 carried by the breaker board and the frame bar 10.

The guide chains receive the severed portion of the stalk and deposit the same upon any suitable form of chute 51, from whence it passes on to the rack or bed 1.

The shaft 12 is driven from one of the wheels on the rear truck, said wheel having a sprocket gear 52 attached thereto, with which coöperates a driving chain 53; the opposite end of the driving chain engaging a sprocket 54 on a shaft 55, said shaft being arranged horizontally and rotatably mounted in a block 56 depending from the frame 7. One end of the shaft 55 has attached thereto a bevel gear 57, which meshes with a bevel pinion 58 attached to the lower end of the shaft 12, a housing 59 being introduced around said bevel gears and the lower portion of the shaft 12. The opposite end of the shaft 55 is provided with a clutch 60, which coöperates with the clutch face on the sprocket 54 and as said clutch is caused to rotate with the shaft 55, the bevel gears will be operated, when the clutch is moved into engagement with the clutch face of said sprocket. The clutch 60 may be of any preferred construction and is moved into or out of engagement with the clutch face by means of a lever 61, this construction being best shown in Fig. 3 of the drawings.

As the frame 7 is pivotally mounted upon the axle 4, the forward end thereof may be raised or lowered to adjust the same for stalks of greater or less length, which is accomplished by pivotally attaching a lever 62 to the bed 1, one end of the lever having a link 63 attached thereto, the opposite end of the link being pivotally mounted to the frame 7 and by swinging the lever in opposite directions, the frame will be raised or lowered. The lever 62 is provided with a latch 64, which latch coöperates with teeth 65 to hold the lever in its adjusted position. This device is adapted to top the stalks in one row at a time, as it is difficult to place the rows a proper distance apart to cause the stalks to enter the space between two of the topping devices.

In starting the topping machine, the clutch is moved into engagement with the sprocket 54, when by moving the vehicle forwardly, the shaft 12 will be operated through the means of the bevel gears, which operation will impart motion to all of the chains of the mechanism. The movement of said chains will bring the fingers thereon in engagement with the stalks passing between the sections of the frame and into engagement with the breaker board with sufficient force to snap the stalk in two at this point, when the guide chains will receive the upper portion of the stalk and deposit the same in the vehicle bed through the medium of the chute at the rear of the topping machine.

This device can be very cheaply constructed and readily applied to use in connection with any suitable form of vehicle and the device operated by attaching the sprocket gear to the wheel of the vehicle, as shown. It will further be seen that by providing the fingers on the chains used for moving the stalk through the frame, said stalk when brought into engagement with the end of the breaker board will be readily severed at this point. It will further be seen that the forward end of the frame may be readily raised or lowered when desired to accommodate the same to stalks of various heights and it will likewise be seen that in view of the lightness of the device, it will require but a minimum amount of power to operate the same.

What we claim is:—

1. In a topping machine, the combination with a vehicle, of a shaft attached to the side of the vehicle, a block on said shaft, a casting having an opening therein to receive said block, a two-part frame mounted upon said casting, means to adjust the casting and frame longitudinally, means to raise or lower the forward end of the frame and means on said frame for cutting stalks and conveying the same to the vehicle.

2. In a topping machine, the combination with a vehicle, of a shaft attached to the vehicle, a block on said shaft, a casting having an opening therein to receive said block, a frame mounted upon said casting, means to adjust the casting and frame longitudinally, means to raise or lower the forward end of the frame, shafts rotatably mounted one pair on the forward and one pair on the rearward portion of the frame, sprockets on said shafts, chains for said sprockets, said chains being moved thereby, fingers on said chains adapted to engage and move the objects passing between the chains, a guide for the fingers of one of said chains, means to drive said shafts, a breaker board positioned in the path of the objects engaged by said chains and guide chains adapted to carry the severed portion of the object to the rear end of the frame.

In testimony whereof we have signed our names to this specification in the presence of two subscribing witnesses.

JOHN GRAVES.
CLARENCE C. REED.

Witnesses:
C. B. JARED,
R. D. HUME.

Copies of this patent may be obtained for five cents each, by addressing the "Commissioner of Patents, Washington, D. C."